United States Patent
Hsiao et al.

(10) Patent No.: US 7,633,711 B2
(45) Date of Patent: Dec. 15, 2009

(54) MAGNETIC WRITE HEAD WITH HELICAL COIL STRUCTURE USING MULTIPLE MATERIALS

(75) Inventors: Wen-Chien David Hsiao, San Jose, CA (US); Edward Hin Pong Lee, San Jose, CA (US); Jennifer Ai-Ming Loo, Gilroy, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 486 days.

(21) Appl. No.: 11/672,483

(22) Filed: Feb. 7, 2007

(65) Prior Publication Data

US 2008/0186628 A1 Aug. 7, 2008

(51) Int. Cl.
*G11B 5/127* (2006.01)
(52) U.S. Cl. .................................. 360/123.38
(58) Field of Classification Search ................. None
See application file for complete search history.

(56) References Cited

U.S. PATENT DOCUMENTS

| | | | | |
|---|---|---|---|---|
| 5,311,386 | A * | 5/1994 | Mallary | 360/125.33 |
| 6,195,232 | B1 * | 2/2001 | Cohen | 360/123.38 |
| 6,278,580 | B1 * | 8/2001 | Sasaki | 360/125.65 |
| 6,335,846 | B1 * | 1/2002 | Gaud et al. | 360/123.39 |
| 6,441,994 | B1 * | 8/2002 | Wang et al. | 360/123.39 |
| 6,661,605 | B1 * | 12/2003 | Pust et al. | 360/125.71 |
| 6,725,527 | B2 * | 4/2004 | Chang et al. | 29/603.14 |
| 6,747,841 | B1 * | 6/2004 | Olim et al. | 360/125.39 |
| 6,754,050 | B2 * | 6/2004 | Kong et al. | 360/317 |
| 6,819,527 | B1 * | 11/2004 | Dill et al. | 360/123.01 |
| 7,092,205 | B1 * | 8/2006 | Pitcher et al. | 360/125.41 |
| 7,092,208 | B2 * | 8/2006 | Zou et al. | 360/128 |
| 7,116,516 | B2 * | 10/2006 | Dill et al. | 360/123.4 |
| 7,259,939 | B2 * | 8/2007 | Sato | 360/317 |
| 7,268,975 | B2 * | 9/2007 | Han et al. | 360/123.01 |

\* cited by examiner

*Primary Examiner*—Allen T Cao
(74) *Attorney, Agent, or Firm*—Zilka-Kotab, PC (57) ABSTRACT

A magnetic write head for perpendicular magnetic recording that has a helical coil design that reduces manufacturing complexity and increases cycle time for manufacture. The write head includes a write pole and a helical write coil having upper coil portions that pass above the write pole and lower coil portions that pass below the write pole. The upper and lower coil portions are connected with another by connection studs. Whereas the upper and lower coil portions are constructed of a non-magnetic, electrically conductive material such as Cu, the connection studs are constructed of a magnetic, electrically conductive material such as NiFe. By constructing the connection studs of a magnetic material, they can be constructed in the same manufacturing steps used to manufacture various magnetic structures of the write head, such as a magnetic shaping layer and/or the back gap. This greatly simplifies the manufacture of the write head by eliminating many additional manufacturing steps that would otherwise be required to manufacture a helical coil having non-magnetic connection studs.

20 Claims, 6 Drawing Sheets

MAGNETIC WRITE HEAD WITH HELICAL COIL STRUCTURE USING MULTIPLE MATERIALS

FIELD OF THE INVENTION

The present invention relates to perpendicular magnetic recording and more particularly to a method for manufacturing a write head having a helical coil design that uses multiple materials for improved manufacturability.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read designs a spin valve sensor, also referred to as a giant magnetoresistive (GMR) sensor, has been employed for sensing magnetic fields from the rotating magnetic disk. The sensor includes a nonmagnetic conductive layer, referred to as a spacer layer, sandwiched between first and second ferromagnetic layers, referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

To further increase the write field of such a magnetic head, the head can be configured with a helical write coil (as opposed to a more common pancake coil). Such a helical coil can be configured to have turns that pass above and below the write pole. Such helical coils are however difficult to construct, because they are formed in a dimension that is perpendicular to the planes of the deposited layers. In other words, if the plane of the deposited layer making up the write head is considered to be a horizontal plane, the write coil is constructed in a dimension that is vertical as well as horizontal.

This inherent manufacturing difficulty results in a great deal of added manufacturing complexity and cost. Therefore, there is a need for a write head structure that can allow the use of a helical write coil while minimizing manufacturing complexity so that such a write head can be practically and cost effectively produced.

SUMMARY OF THE INVENTION

The present invention provides write head structure having a helical write coil that can be efficiently manufactured with minimal manufacturing complexity and with a minimum of manufacturing steps. The write head includes a write pole and a helical write coil having upper coil portions that pass above the write pole and lower coil portions that pass below the write pole. The upper and lower coil portions are electrically connected with another by connection studs. Whereas the upper and lower coil portions are constructed of a non-magnetic, electrically conductive material such as Cu, the connection studs are constructed of a magnetic, electrically conductive material such as NiFe.

By constructing the connection studs of a magnetic material, they can advantageously be constructed in the same manufacturing steps used to manufacture various magnetic structures of the write head, such as a magnetic shaping layer and/or the back gap. This greatly simplifies the manufacture of the write head by eliminating many additional manufacturing steps that would otherwise be required to manufacture a helical coil having non-magnetic connection studs.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
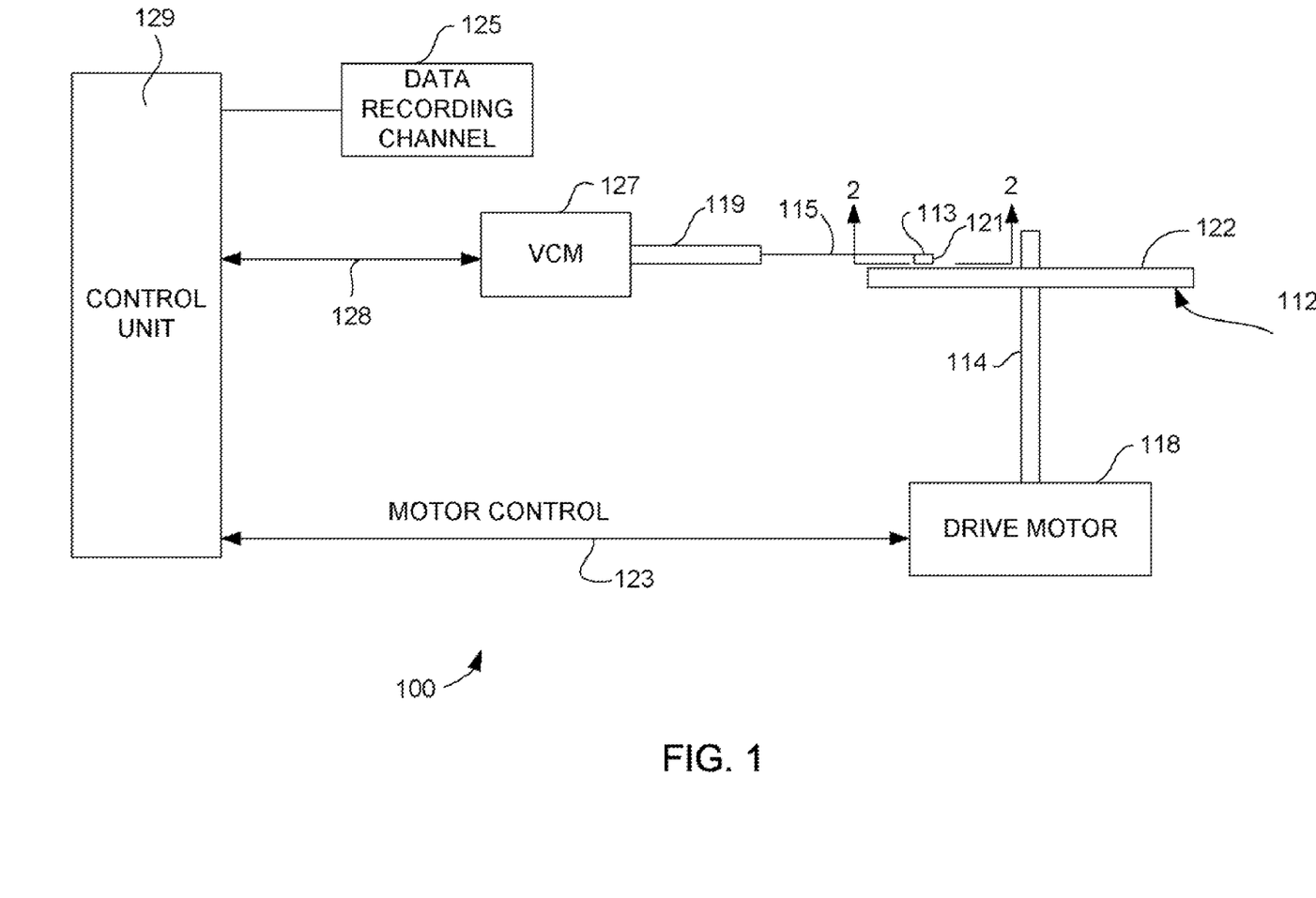
FIG. 1 is a schematic illustration of a disk drive system in which the invention might be embodied.

Referring now to FIG. 1, there is shown a disk drive 100 embodying this invention. A shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 221. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
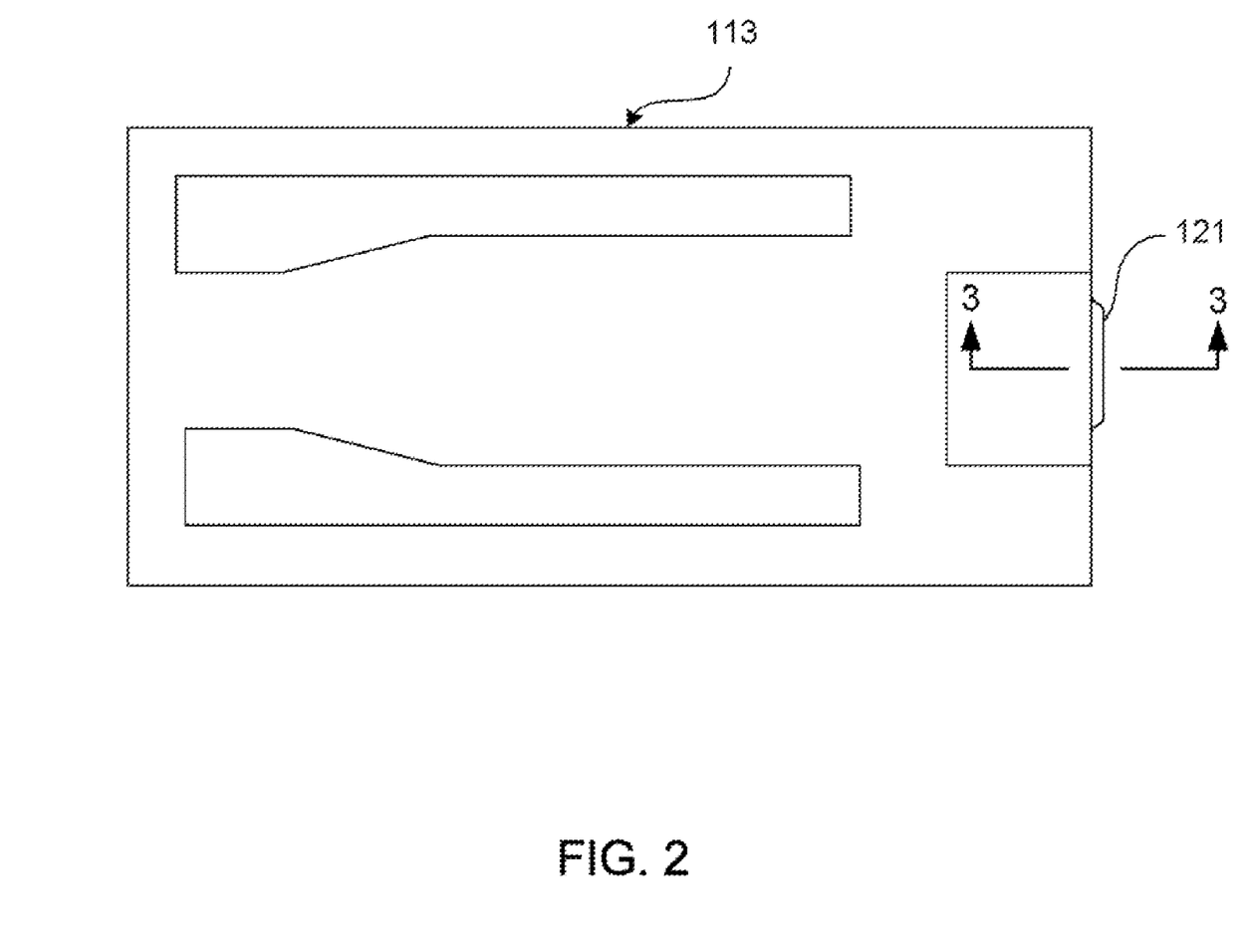
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
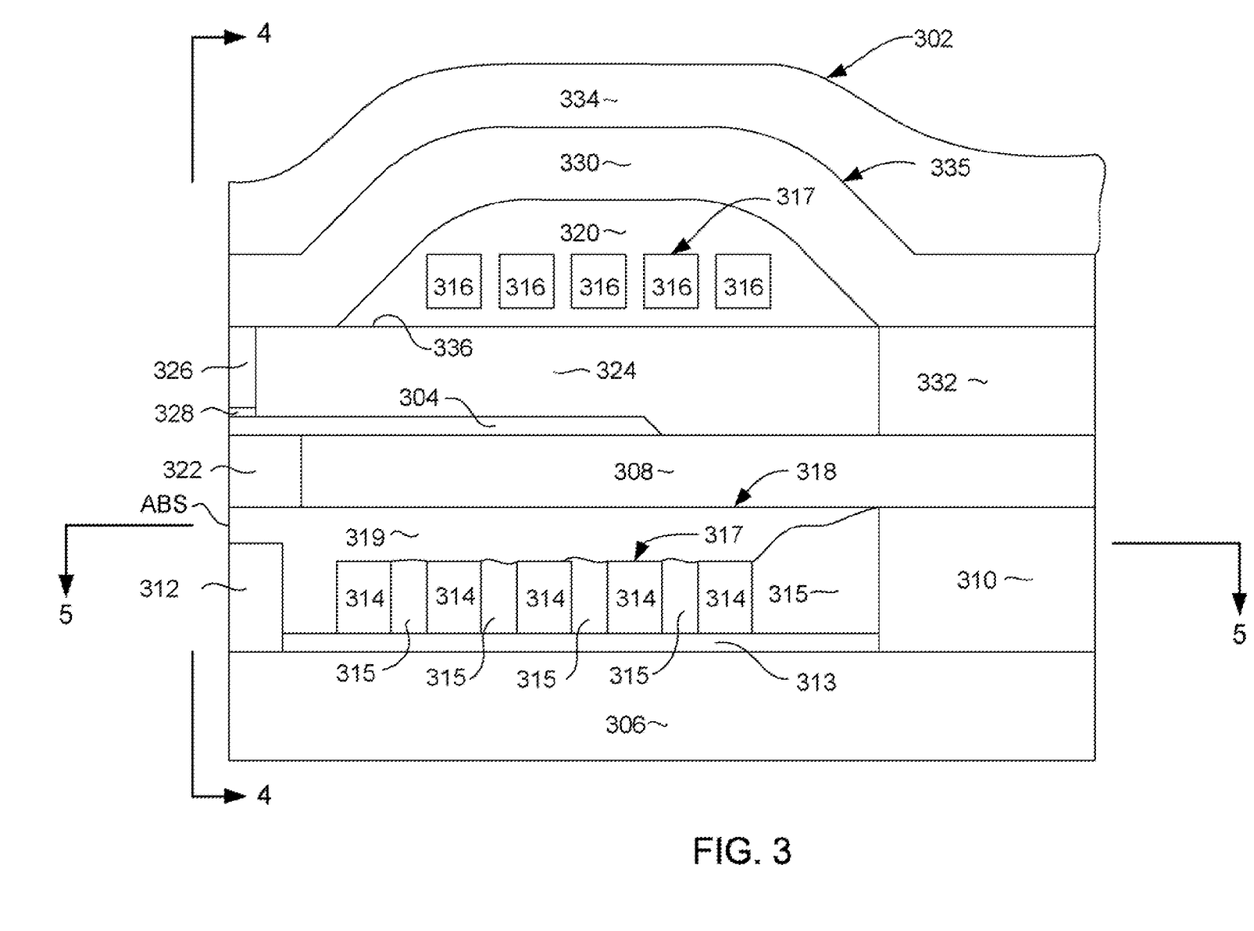
FIG. 3 is a cross sectional view, taken from line 3-3 of FIG. 2 and rotated 90 degrees counterclockwise, of a magnetic head according to an embodiment of the present invention.

With reference now to FIG. 3, the invention can be embodied in a magnetic head 302. The write head 302 includes a magnetic write pole 304 and a first or bottom magnetic return pole 306. The write pole 304 can be constructed on a magnetic shaping layer 308. The bottom return pole 306 is magnetically connected with the shaping layer 308 and with the write pole 304 by a first magnetic back gap structure 310. The write pole 304 and first return pole extend to an air bearing surface (ABS). A magnetic pedestal 312 may extend from the trailing edge of the first return pole 306 at the ABS. This pedestal can be useful in preventing stray fields from inadvertently reaching the magnetic medium (not shown). The first return pole 308, first back gap 310, shaping layer and pedestal 312 can be constructed of a material such as NiFe or CoFe. The write pole 304 can be constructed of a high moment magnetic material such as CoFe, and is preferably a laminated structure comprising layers of CoFe separated by this layers of non-magnetic material.

With reference still to FIG. 3, the write head 302 includes first and second coil portions 314, 316, shown in cross section in FIG. 3, which can be constructed of an electrically conductive material such as Cu. The first and second coil portions 314, 316 are upper and lower portions of a common helical coil 317. The first, or lower coil portion 314 sits atop a layer 313 of non-magnetic, electrically insulating material such as alumina and is embedded in an insulation layer 318, which can include a hard baked photoresist layer 315 in and around the turns of the coils and may also include an alumina fill layer 319 above and in front of the coil. The second, or upper coil portion 316 is embedded in an upper coil insulation 320 that, as shown in FIG. 3, can be hard baked photoresist or some other material. The write head 302 can include other non-magnetic, electrically insulating fill layers such as an alumina ($Al_2O_3$) fill layer 322 between the shaping layer 308 and the ABS, and a planarized fill layer 324, such as alumina, above the write pole 304 and shaping layer 308.

Figure 4:
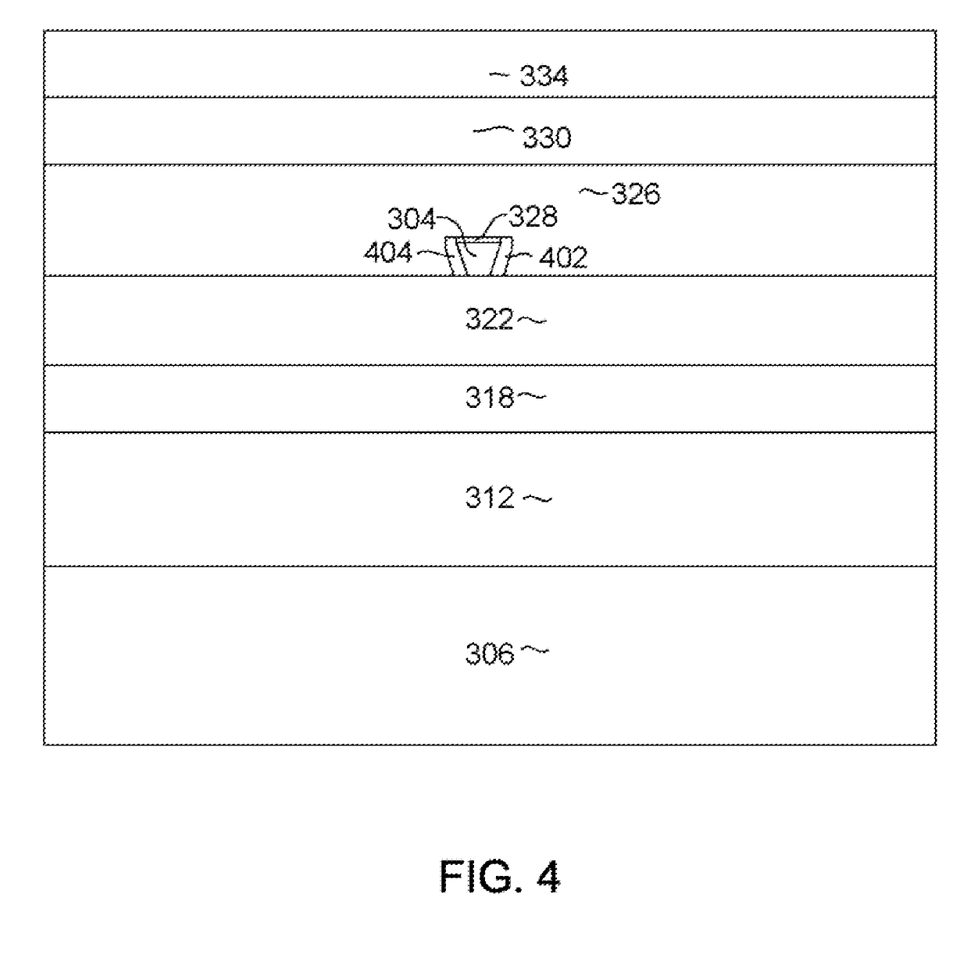
FIG. 4 is an ABS view of the write head taken from line 4-4 of FIG. 3.

With reference FIGS. 3 and 4, the write head 302 can include a trailing magnetic shield 326, which can be separated from the trailing edge of the write pole 304 by a trailing gap 328. The trailing shield 326 can be constructed of a magnetic material such as NiFe or CoFe and the trailing gap can be constructed of a non-magnetic material such as alumina ($Al_2O_3$), Rh, etc. The trailing shield can be formed to wrap around the write pole 304 having side shield portions that are separated from the write pole 304 by non-magnetic side gap layers 402, 404. Alternatively, the trailing shield could be constructed as a pure trailing shield that does not have these side portions that wrap around the write pole 304.

As seen in FIG. 4, which is an ABS view of the head 302, the write pole 304 can be configured with a tapered or trapezoidal shape, which advantageously prevents the head 302 from inadvertently writing to adjacent tracks as a result of head skew when writing to inner or outer portions of the disk.

With reference again to FIG. 3, a second, or upper, return pole 330 can also be provided, and can be constructed to contact the trailing shield 326 and as seen in FIG. 3, the second return pole 330 can magnetically connect the trailing shield 326 with a second back gap portion 332. Therefore, as can be seen, the trailing shield 326, write pole 304 and return pole 306 can all be magnetically connected with one another in a region removed from the ABS. A protective layer 334 of, for example, alumina can be provided over the top of the upper return pole 330 to protect the elements of the write pole 302 from corrosion or other damage. The various magentic structures: first return pole 306, first back gap layer 310, shaping layer 308, write pole 304, second back gap 332, second return pole 330, pedestal 312 and trailing shield 328 together form a magnetic yoke structure 335.

Figure 5:
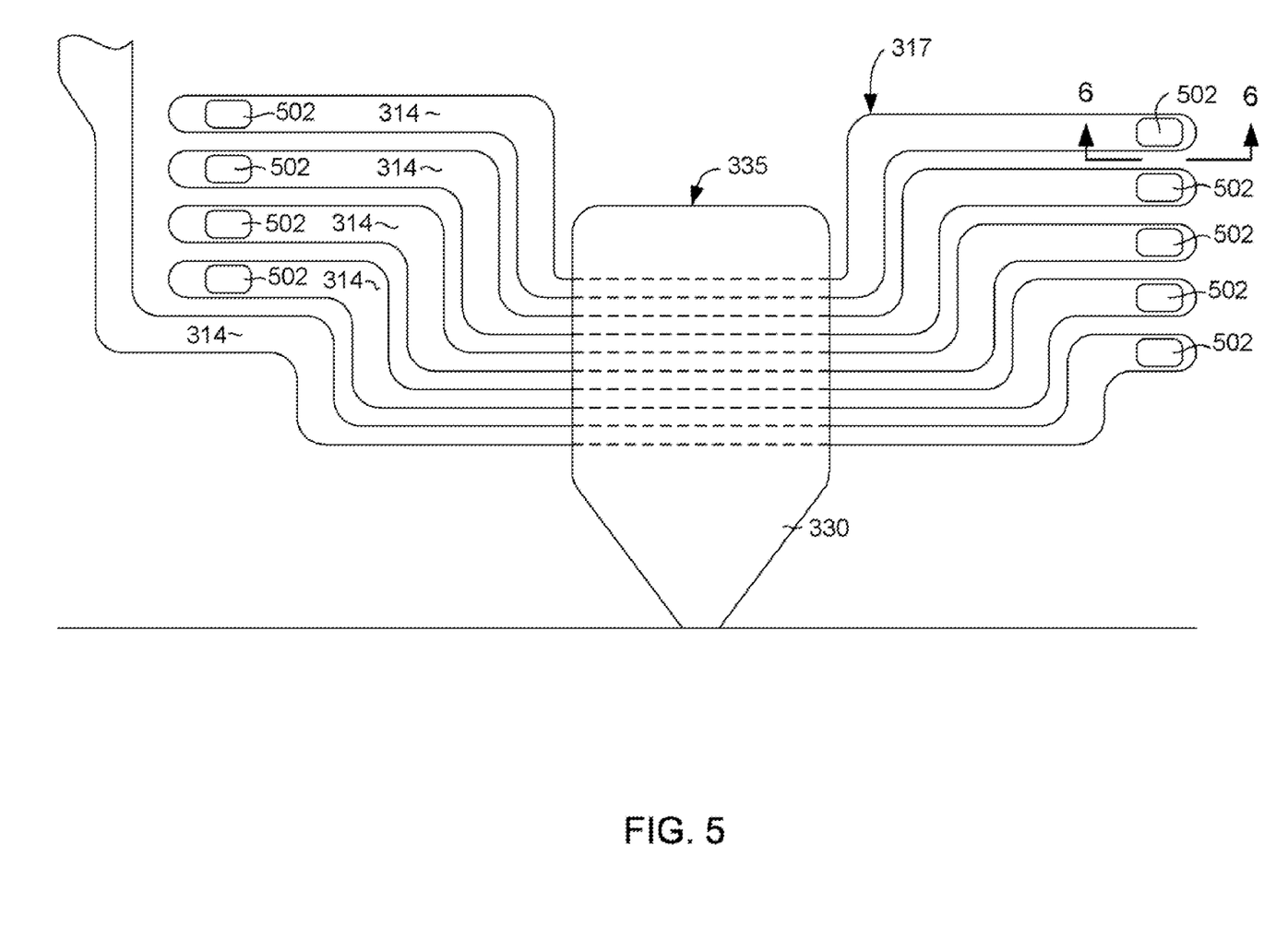
FIG. 5 is a top down view of a write head taken from line 5-5 of FIG. 4.
Figure 6:
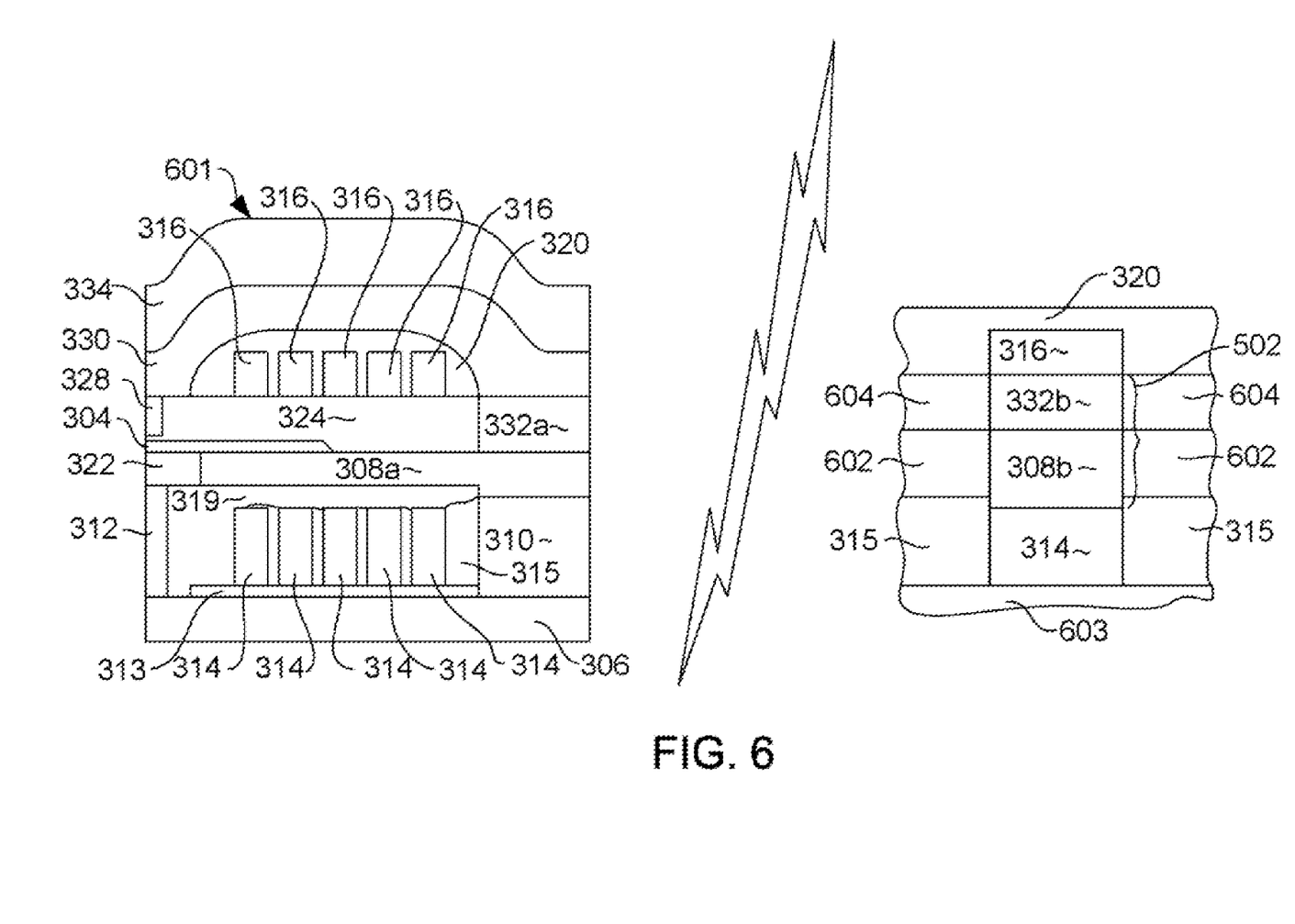
FIG. 6 is a side cross sectional view of both a coil connection structure and a write pole, the two views being placed side by side to illustrate a relationship between the layers of the structures.

As mentioned above, the upper and lower coil portions 314, 316 are portions of a common helical write coil 317. With reference to FIG. 6, the lower portions 314 of the coil 317 can be seen in a top down view. As described above with reference to FIG. 3, the lower portions 314 pass beneath the shaping layer 308, write pole 304 and upper return pole 330. Therefore, as shown in FIG. 5, where the lower portions 314 pass beneath these magnetic structures, the lower portions 314 are shown in dashed line to indicate that they are hidden behind these structures in this top down view. Although the lower portions 314 of the coil 317 pass beneath these various structures 308, 304, 330, only the upper return pole 330 is shown in FIG. 5, as the other structures are hidden beneath the upper return pole 330. As can be seen, the lower coil portions 314 extend significantly laterally beyond the yoke 335 of the write head 302. The upper coil portions 316 also extend significantly laterally beyond the yoke 335, however, the upper coil portions 316 are not shown in FIG. 6, for purposes of clarity.

With continued reference to FIG. 5, the coil 317 also includes connecting stud structures 502 connected with the ends of the lower coil portions 314. These connecting studs are constructed of an electrically conductive material and function to electrically connect the lower coil portions 314 with the upper coil portions 316 in order to complete the helical coil structure 317. The upper coil portions 316 are shown in FIG. 3, but are not shown in FIG. 5 in order to more clearly show the connecting studs 502 and underlying lower coil portions 314.

FIG. 6 illustrates the relationship between a main write head portion 601 and the outer end portions of the coil 317, the main write head portion being similar to the structure described above with reference to FIG. 3. The outer portions of the coil 317 are show side by side with the cross section of the main write head portion 601 in FIG. 6 in order to illustrate the advantageous relationship between layers of each structure, however, it should be understood that they are not scale and are not actually oriented relative to each other as shown in FIG. 6. The physical arrangement of the outer coil portions relative to the main write head portion 601 can be more clearly understood with reference to the top down view of FIG. 5.

With continued reference to FIG. 6, it can be seen that the lower coil portion sits upon an underlying insulation layer 603. As mentioned above, the lower coil portion 314 is constructed of a non-magnetic, electrically conductive material such as Cu. Similarly, the upper coil portion 316 is constructed of a non-magnetic, electrically conductive material such as Cu. The connecting stud structure 502 on the other hand is constructed partially or entirely of a magnetic, electrically conductive material such as NiFe, because the connecting stud portions located away from the magnetic pole portions of the write head 302, constructing the stud portions of a magnetic material does not adversely affect write head performance. However, constructing the stud portions 502 of a magnetic material, rather than a non-magnetic material such as Cu provides significant manufacturing advantages as will be described in greater detail below.

As can be seen in FIG. 6, the stud portion 502 consists of layers that correspond with other magnetic layers of the write head, meaning that they are constructed of the same material and at the generally the same build elevation as one another. This allows those layers to be formed in the same photolithography and deposition steps as those used in constructing the rest of the write head. For example, as shown in FIG. 6 layer 308b of the stud structure 502 corresponds with the shaping layer 308a of the main write head portion 601. Similarly, a layer 332b of the connection stud 502 corresponds with the upper back gap layer 332a of the main write head portion 601. The relationship between the layers of the connecting stud 502 and the main write pole portion 601 is for purposes of illustration. The connecting stud could have layers that correspond to other magnetic structures of the main write pole portion 601 as well. The layers 308a, 308b of the connector stud 502 can be constructed of, for example, a NiFe alloy such as an alloy having about 20, 55 or 78 atomic percent Fe. In other words the Fe content could vary and could be any percentage such as 15-25 atomic percent 50-60 atomic percent or 70-85 atomic percent. However, the materials making up the connecting stud 502 are not limited to NiFe or to a NiFe alloy having these compositions.

The bottom coil portion 314 can be surrounded at its sides by an insulation layer, such as the hard baked photoresist layer 315 that insulates the lower coil portions 314 within the main write pole portion 601. Another insulation layer 602, 604 can be provided at the sides of the layers 308b, 322b to insulate the connecting stud, and these insulation layers 602, 604 can be constructed of a non-magnetic, electrically insulating material such as alumina. Similarly, the hard baked photoresist insulation layer 320 used to insulate the upper coil portions 316 can be used to insulate and protect the upper coil portion 316.

The write head design described above with reference to FIG. 6 greatly facilitates the manufacture of a helical coil in a write head. This is because, by allowing the connecting stud 502 to be constructed of the same magnetic materials as the structures (eg. 308a, 332a) of the main write head portion 601, the connecting stud can be constructed in the same steps used to produce the write head. The connecting stud 502 can, therefore, be constructed without the need for additional costly photolithography, ion milling, etching and/or deposition steps that would be needed if the connection stud 502 were constructed of Cu. If the connection stud 502 were constructed of, for example, Cu, then a via would have to be formed in the insulation layers 602, 604 and separate masking and deposition steps would have to be performed to construct the Cu stud. Constructing the coil of different materials, such as described above reduces the number of manufacturing operation that must be performed and reduces cycle time. In fact the present invention can eliminate approximately 30 manufacturing operations and can reduce cycle time by about 22 hours.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claims is:

1. A magnetic write head for perpendicular magnetic recording, comprising:
    a magnetic write pole having a leading edge, a trailing edge and first and second laterally opposed sides, the write pole extending to an air bearing surface; and
    an electrically conductive write coil further comprising;
        a lower coil portion, constructed of a non-magnetic, electrically conductive material, formed below the write pole, the lower coil portion being separated from the write pole and extending laterally beyond the first and second laterally opposed sides of the write pole;
        an upper coil portion, constructed of a non-magnetic, electrically conductive material, formed above the write pole, the upper coil portion being separated from the write pole and extending laterally beyond the first and second laterally opposed sides of the write pole; and
        a connection stud connected with the upper and lower coil portions in a region laterally beyond one of the first and second sides of the write pole, the connection stud comprising a magnetic, electrically conductive material.

2. A magnetic write head as in claim 1 wherein the connection stud comprises NiFe.

3. A magnetic write head, comprising:
    a magnetic yoke structure constructed of a magnetic material and including a magnetic write pole that extends to an air bearing surface; and
    a helical write coil that comprises:
        a lower coil portion passing beneath the write pole and extending laterally beyond the magnetic yoke structure, the lower coil portion comprising a non-magnetic, electrically conductive material;
        an upper coil portion passing above the write pole and extending laterally beyond the magnetic yoke structure, the upper coil portion comprising a non-magnetic, electrically conductive material; and
        a connection stud connected with the lower coil portion and the upper coil portion in a region laterally beyond the magnetic yoke structure, the connection stud comprising a magnetic, electrically conductive material.

4. A magnetic head as in claim 3 wherein the connection stud and at least a portion of the magnetic yoke structure are constructed of the same material.

5. A magnetic head as in claim 3 wherein at least a portion of the magnetic yoke structure and at least a portion of the connection stud comprise NiFe.

6. A magnetic write head as in claim 3 wherein the magnetic yoke structure comprises a magnetic back gap structure constructed of a magnetic material and wherein at least a portion of the connection stud is constructed of the same magnetic material as the back gap structure.

7. A magnetic head as in claim 6 wherein at least a portion of the back gap structure and the connection stud comprise NiFe.

8. A magnetic head as in claim 6 wherein at least a portion of the back gap structure and a portion of the connection stud have been formed in common manufacturing steps.

9. A magnetic write head as in claim 3 wherein the magnetic yoke structure comprises a magnetic shaping layer structure magnetically connected with the write pole and constructed of a magnetic material and wherein at least a portion of the connection stud is constructed of the same magnetic material as the shaping layer structure.

10. A magnetic write head as in claim 9 wherein the shaping layer structure and at least a portion of the connection stud structure comprise NiFe.

11. A magnetic write head and as in claim 9 wherein the shaping layer structure and at least a portion of the connection stud structure are constructed in common manufacturing steps.

12. A magnetic write head as in claim 3 wherein the upper coil portion and the lower coil portion are constructed of Cu and wherein at least a portion of the connection stud comprises NiFe.

13. A magnetic write head for perpendicular magnetic recording, comprising:
    a first magnetic return pole constructed of a magnetic material and having an end disposed at an air bearing surface and an end opposite the air bearing surface;
    a first magnetic back gap layer, above and magnetically connected with the first magnetic return pole at the end opposite the air bearing surface;
    a magnetic shaping layer formed above and magnetically connected with the first back gap layer, the magnetic shaping layer extending toward but not to the air bearing surface;
    a magnetic write pole formed above and magnetically connected with the magnetic shaping layer and extending to the air bearing surface;
    a second magnetic back gap layer, formed above and magnetically connected with the shaping layer in a region removed from the air bearing;
    a second magnetic return pole, formed above and magnetically connected with the second back gap layer, wherein the first magnetic return pole, the first magnetic back gap layer, the magnetic shaping layer, the magnetic write pole, the second magnetic back gap layer and the second return pole together form a magnetic yoke;
    a lower coil portion, comprising a non-magnetic, electrically conductive material, passing between the magnetic shaping layer and the first return pole and extending laterally beyond the yoke;
    an upper coil portion, comprising a non-magnetic, electrically conductive material, passing between the magnetic shaping layer and the second return pole and extending laterally beyond the yoke; and
    a connecting stud, comprising a magnetic, electrically conductive material formed between, and electrically connecting the upper and lower coil portions to one another in a region outside of the yoke; wherein
    the lower coil portion, upper coil portion and connection stud together form a helical coil that wraps around the magnetic shaping layer.

14. A magnetic write head as in claim 13 wherein the magnetic connection stud comprises NiFe.

15. A magnetic write head as in claim 13 wherein the first magnetic back gap layer, magnetic shaping layer, second magnetic back gap layer and connection stud all comprise NiFe and wherein the upper and lower coil portions comprise Cu.

16. A magnetic write head as in claim 13 wherein the connection stud comprises a magnetic layer that corresponds with the magnetic shaping layer, the magnetic layer and the magnetic shaping layer being formed at a common build elevation within the write head.

17. A magnetic write head as in claim 13 wherein the connection stud comprises a magnetic layer that corresponds with the second magnetic back gap layer, the magnetic layer and the second magnetic back gap layer being formed of the same material and at a common build elevation within the write head.

18. A magnetic write head as in claim 13 wherein the connection stud comprises a first magnetic layer that is formed of the same material as, and at a same build elevation as the magnetic shaping layer, and wherein the connection stud further comprises a second magnetic layer that is formed of the same material as, and at a same build elevation as the second back gap layer.

19. A magnetic head as in claim 13 wherein the upper and lower coil portions comprise Cu and the connection stud and shaping layer comprise NiFe, the atomic percentage of Fe in the connection stud being the same as the atomic percentage of Fe in the shaping layer.

20. A magnetic head as in claim 13 wherein the upper and lower coil portions comprise Cu and the connection stud and second back gap layer comprise NiFe, the atomic percentage of Fe in the connection stud being the same as the atomic percentage of Fe in the second back gap layer.

* * * * *